United States Patent [19]
Dasan

[11] Patent Number: 5,761,662
[45] Date of Patent: Jun. 2, 1998

[54] PERSONALIZED INFORMATION RETRIEVAL USING USER-DEFINED PROFILE

[75] Inventor: Vasanthan S. Dasan, Colorado Springs, Colo.

[73] Assignee: Sun Microsystems, Inc., Mountain View, Calif.

[21] Appl. No.: 852,455

[22] Filed: May 8, 1997

Related U.S. Application Data

[63] Continuation of Ser. No. 360,997, Dec. 20, 1994, abandoned.

[51] Int. Cl.$^6$ .................................................. G06F 17/30
[52] U.S. Cl. .......................... 707/10; 707/9; 707/100; 707/104; 707/3; 707/4; 707/513; 395/200.36
[58] Field of Search .................... 707/10, 9, 3, 4, 707/100, 104, 513; 395/200.36

[56] References Cited

U.S. PATENT DOCUMENTS

| | | | |
|---|---|---|---|
| 5,124,909 | 6/1992 | Blakely et al. | 395/200 |
| 5,200,993 | 4/1993 | Wheeler et al. | 379/96 |
| 5,309,351 | 5/1994 | McCain et al. | 364/132 |
| 5,347,632 | 9/1994 | Filepp et al. | 395/200 |
| 5,404,523 | 4/1995 | DellaFera et al. | 395/650 |
| 5,463,625 | 10/1995 | Yasrebi | 370/85.13 |
| 5,550,657 | 8/1996 | Bly et al. | 395/425 |

OTHER PUBLICATIONS

M Sanderson, "NRT (News Retrieval Tool) A User's Guide," IEEE Colloq. 1990, No. 101; pp. 5/1–5/14.

MCI Telecommunications, Inc., *Network MCI Business*, Pamphlet, Marketing Information (Oct. 1994).

Berners–Lee, T. and Daniel Connolly, *Hypertext Markup Language*, 1–36, Jun. 1993.

Berners–Lee, T., *Hypertext Transfer Protocol*, 1–25, Jun. 1993.

Author Unknown, *A Beginner's Guide to HTML*, 1–14, Jun. 1993.

M. Pazzani et al.: Learning from Hotlists and Coldlists: Towards a WWW Information Filtering and Seeking Agent; pp. 492–495; Dept. of Information and Computer Science, UC Irvine, Nov. 1995.

J. Powell: Adventures with the World–Wide Web: Creating a Hypertext Library Information System; pp. 59–66, Feb. 1994.

T. Lau: Building a Hypermedia Information System on the Internet; pp. 192–197, Sep. 1994.

B.K. Duval et al.: Microcomputer Applications in the Library; pp. 269–279, 1994.

*Primary Examiner*—Thomas G. Black
*Assistant Examiner*—C. Lewis
*Attorney, Agent, or Firm*—Blakely Sokoloff Taylor & Zafman

[57] ABSTRACT

An automatic method and system for retrieving information based on a user-defined profile (e.g. a personalized newspaper). A user-controlled client establishes communication with a stateless server, the server presenting a list of options to the client between the server and the client. The client provides an identification of the user-defined profile. The server engages a first application program, the first application program retrieving the user-defined profile wherein the user-defined profile identifies information which is of interest to the user. The first application program examines a database of information and automatically retrieves a subset of the information from the database based upon which information is of interest to the user as identified in the user-defined profile. The server presents the subset of the information from the database as generated by the first application program to the client. The first application program can store a file containing the user-defined profile in order to retain a state of the user-profile, and cause the stateless server to emulate a server which retains its state from session to session.

26 Claims, 12 Drawing Sheets

500

500

Add to Profile

700

Edit Profile
900

PERSONALIZED INFORMATION RETRIEVAL USING USER-DEFINED PROFILE

This is a continuation of application Ser. No. 08/360,997 filed Dec. 20, 1994 and now abandoned.

BACKGROUND OF THE INVENTION

1. Field of the Invention

The present invention relates to information retrieval. More specifically, the present invention relates to a client/server model for information retrieval based upon a user-defined profile, for example, for the generation of an "electronic" newspaper which contains information of interest to a particular user.

2. Background Information

The development of computerized information resources, such as the Internet, and various on-line services, such as Compuserve, America On-line, Prodigy, and other services, has led to a proliferation of electronically-available information. In fact, this electronic information is increasingly displacing more conventional means of information transmission, such as newspapers, magazines, and even, television. The primary issue in all of these resources is filtering the vast amount of information which is available in order that a user obtain that information which is of interest to him.

Currently, a user who subscribes to one of the above-services, or uses the Internet, must manually scan through the various information resources in order to obtain articles, postings, or other files which are of interest. Typically, the user manually scans in areas or sources of interest (publications, USENet Newsgroups, fora, or other areas classified by topic) to find topic areas which may be of interest to the user. The user then retrieves articles or files which have subject headings, for example, matching those which the user wishes to read. For example, certain USENet newsgroups on the Internet have an established etiquette (known as "netiquette"), wherein postings must have relevant subject headings to permit this type of manual scanning. Article headings in newspapers/magazines serve similar functions. Thus, if the user does not wish to view those stories with products for sale, then he simply ignores those postings having the term "For Sale" in the subject heading. Finally, as a last level of filtering, the user can read the stories which have been filtered by topic, and subject heading, and if anytime during the viewing of the story the user wishes to ignore the rest of the article, he can stop reading it and simply discard the story. If desired, the user can download the remaining stories in any number of prior art ways, for off-line viewing.

As is clearly evident, this manual scanning process which a user must engage in is very time-consuming. To some extent, news is already filtered for readers. Those that subscribe to certain magazines/newspapers, or view certain television networks, already have the vast base of electronically-available information (e.g. wire services) filtered for them. However, this "filtering" is performed on a large-scale basis, for a wide audience. The tailoring of specific stories of interest to particular users has not been performed. Thus, a need has arisen to automatically sort through the large variety of electronic sources in order to generate a subset of the stories available in electronic form which is tailored to a user's specific interests is desired.

Thus, the prior art of obtaining user-relevant information from electronic sources suffers from several shortcomings.

SUMMARY

An automatic method and system for retrieving information based on a user-defined profile (e.g. a personalized newspaper). A user-controlled client establishes communication with a stateless server, the server presenting a list of options to the client (e.g. via Hypertext Transfer Protocol (HTTP) exchanges) between the server and the client. The client provides an identification of the user-defined profile. The server engages a first application program (e.g. via a Common Gateway Interface (CGI)), the first application program retrieving the user-defined profile wherein the user-defined profile identifies information which is of interest to the user. The first application program examines a database of information and automatically retrieves a subset of the information from the database based upon which information is of interest to the user as specified in the user-defined profile. The server presents the subset of the information from the database as generated by the first application program to the client.

In one implementation the client comprises an HTTP browser application program and the server comprises an HTTP server application program operative on a remote computer system. The first application program stores a file containing the user-defined profile in order to retain a state of the user-profile, and cause the stateless HTTP server to emulate a server which retains its state from session to session.

In one implementation, the first application program examines the database of information and automatically retrieves a subset of the information from the database based upon the user-defined profile at periodic intervals, in order, for example, to keep the newspaper-up-to-date.

The user-defined profile can include source identifications and associated search terms wherein the first application scans in the information (e.g. a raw news source, USENet newsgroup or other resource) for sources identified by the source identifications. A first set of files in the sources containing the associated search terms may then be identified and the first application program places the first set of files into the subset of the information, for creation of the personalized information—the newspaper. The source identifications and associated search terms from the user-defined profile can be stored by topic wherein the subset is displayed to the user arranged by topic.

The first application program can also cause the server to present options to the user to create or modify the profile, including, a first option to allow the user to specify source identifications in the information and associated search terms to search for in the source identifications to the user-defined profile; and a second option to specify delete and/or change the source identifications and/or the associated search terms in the profile.

BRIEF DESCRIPTION OF THE DRAWINGS

The present invention is illustrated by way of example and not limitation in the figures of the accompanying in which like references indicate like elements and in which.

DETAILED DESCRIPTION

The present invention is a method and apparatus for automatically scanning information using a user-defined profile, and providing relevant stories from that information to a user based upon that profile. Although the following will be described with reference to certain particular embodiments, including data structures, flow of steps, hardware configurations, etc. . . . , it will be apparent to one skilled in the art that implementations of the present invention can be practiced without these specific details.

Figure 1:
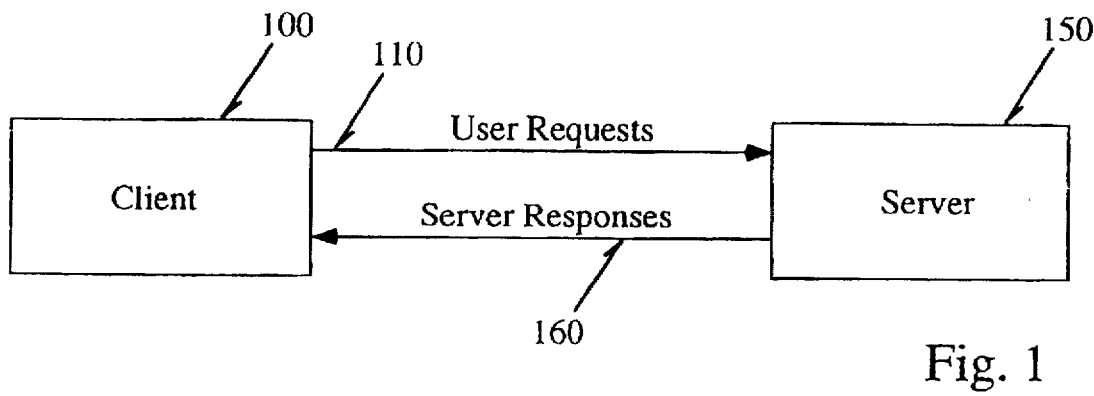
FIG. 1 shows a client/server system in which embodiments of the present invention may be implemented.

Implementations of the present invention use a client/ server architecture, as illustrated in FIG. 1, wherein user requests 110 for news are sent by a client application program 100 to a server 150 (typically, a remote computer system accessible over the Internet or other communication medium). The server 150, as will be described in more detail below, performs scanning and searching of raw (e.g. unprocessed) information sources (e.g. newswires or newsgroups), based upon these user requests, presents the filtered electronic information as server responses 160 to the client process. The client process may be active in a first computer system, and the server process may be active in a second computer system, and communicate with one another over a communication medium, thus providing distributed functionality and allowing multiple clients to take advantage of the information gathering capabilities of the server.

Figure 2:
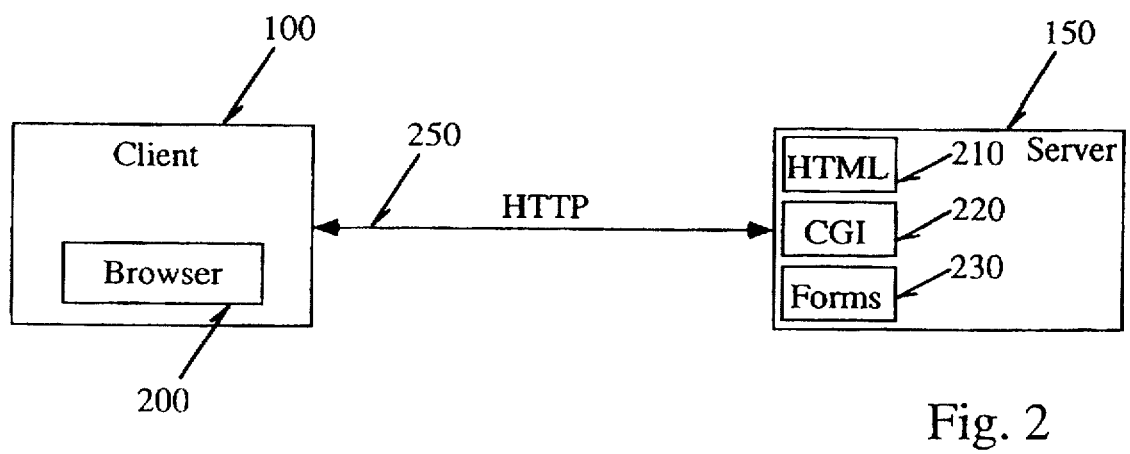
FIG. 2 shows a more detailed view of the client/server illustrated in FIG. 1.

A more detailed view of the client and server are shown in FIG. 2. Although the client and server are processes which are operative within two computer systems, these processes being generated from a high level programming language (e.g. C or C++), compiled and executed in a computer system (e.g. a workstation), it can be appreciated by one skilled in the art that they may be implemented in a variety of hardware devices, either programmed or dedicated.

Client 100 and server 150 communicate using the functionally provided by the World-Wide Web (WWW). Clients and servers of the WWW communicate over a communication medium 250 using a standard known as the Hypertext Transfer Protocol (HTTP). In some embodiments, the client and server may be coupled via Serial Line Internet Protocol (SLIP) or TCP/IP connections for high-capacity communication. Active within the client is a first process, known as a "browser" 200, which establishes the connection with server 150, and presents information to the user. Any number of commercially or publicly-available browsers may be used, in various implementations, however in this implementation, browser 200 is the Mosaic brand browser (version 2.0 or greater) available from the National Center for Supercomputing Applications (NCSA) in Urbana-Champaign, Ill. Other browsers such as the Netscape, Netcruiser, or the Lynx brand browsers, or others, which are available and provide the functionality specified under HTTP and the Mosaic version 2.0 brand browser or above may be used.

The server 150 executes the corresponding server software which presents information to the client in the form of HTTP responses. The HTTP responses correspond with the web "pages" represented using Hypertext Markup Language (HTML), or other data which is generated by the server, as will now be discussed.

A shortcoming of HTTP is that it is a stateless protocol. The Web "page" from which user transactions may be performed in the server under control of the client is not recalled from client-session to client-session. In this implementation of the present invention the user is able to connect to the remote server and specify a user profile, setting forth his interests. The user is able to specify the context for the information to be searched (e.g. the date). The user is able to save the profile on the remote machine. Finally the user is able to retrieve the personal profile (with any access control, if desired) and edit (add or delete entries) and save it for future operations.

All of this functionality requires an underlying mechanism which is unmet by current versions of HTTP. Under the Mosaic brand browser 2.0 and greater, in addition to HTML functionality 210 provided by the server (display and retrieval of certain textual and other data based upon Hypertext views and selection of item(s)), a Common Gateway Interface (CGI) 220 is provided which allows the client program to direct the server to commence execution of a specified program contained within the server. Using this interface, and HTTP, the server may notify the client of the results of that execution upon completion. The server's application program, the personal newspaper generator, maintains a record of the state of each user's profile, and thus, provides state functionality from session to session to an otherwise stateless protocol.

In order to control the parameters of the execution of this server-resident process, the client may direct the filling out of certain "forms" from his browser. This is also provided by the "fill-in forms" functionality 230 available under Mosaic version 2.0 and greater, which allows the user via his client application program 100, to specify a "profile" in which the server will cause an application program to function (e.g. the types of stories/articles which are of interest to the user). The details of a user profile will be discussed below.

Figure 3:
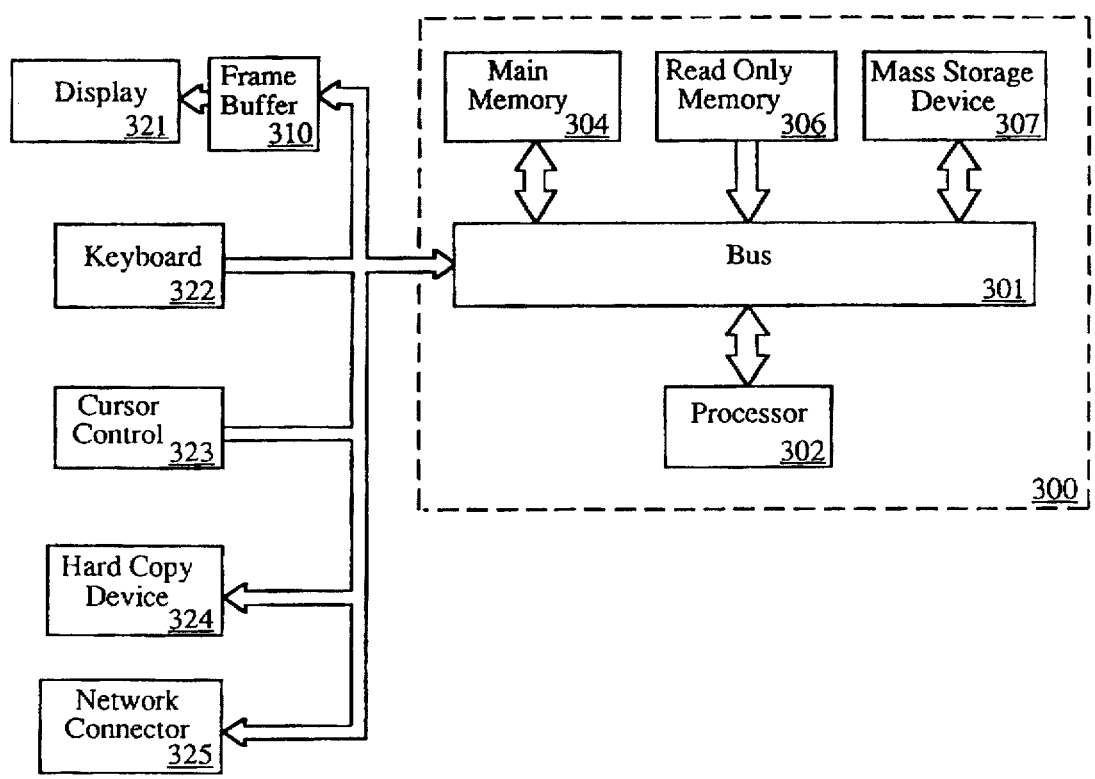
FIG. 3 shows the structure of a workstation in which the client or server may be operative.

A computer system, such as a workstation, personal computer or other processing apparatus in which the client 100 or server 150 may be operative is illustrated in FIG. 3. A workstation in which one implementation of the present invention may be practiced includes system 300. 300 comprises a bus or other communication means 301 for communicating information, and a processing means 302 coupled with bus 301 for processing information. System 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. System 300 also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions. This may be used for storage of the databases to be described here which maintain information about currently defined problem descriptions using commercially available software products.

System 300 may further be coupled to a display device 321, such as a cathode ray tube (CRT) or liquid crystal display (LCD) coupled to bus 301 for displaying information to a computer user. Such a display 321 may further be coupled to bus 301 via a frame buffer 310, which information such as a single or multiple frames or images for display upon display device 321. An alphanumeric input device 322, including alphanumeric and other keys, may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321.

Note, also, that any or all of the components of system 300 and associated hardware may be used in various embodiments, however, it can be appreciated that any configuration of the system may be used for various purposes according to the particular implementation.

In one embodiment, system 300 is one of the Sun Microsystems® brand family of workstations such as the SPARCstation brand workstation manufactured by Sun Microsystems® of Mountain View, Calif. Processor 302 may be one of the SPARC brand microprocessors manufactured by Sun Microsystems®, Inc. of Mountain View, Calif.

Note that the following discussion of various embodiments discussed herein will refer specifically to a series of routines which are generated in a high-level programming language (e.g., the C or C++ programming language) and compiled, linked, and then run as object code in system 300 during run-time, for example by the SPARCompiler available from SunSoft of Mountain View, Calif. (SPARC and SPARCstation are trademarks of SPARC International, Inc. and are licensed exclusively to Sun Microsystems). These further are used in conjunction with the browser and server software available from NCSA, as described above, including the specification of the appearance of displays in HTML. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
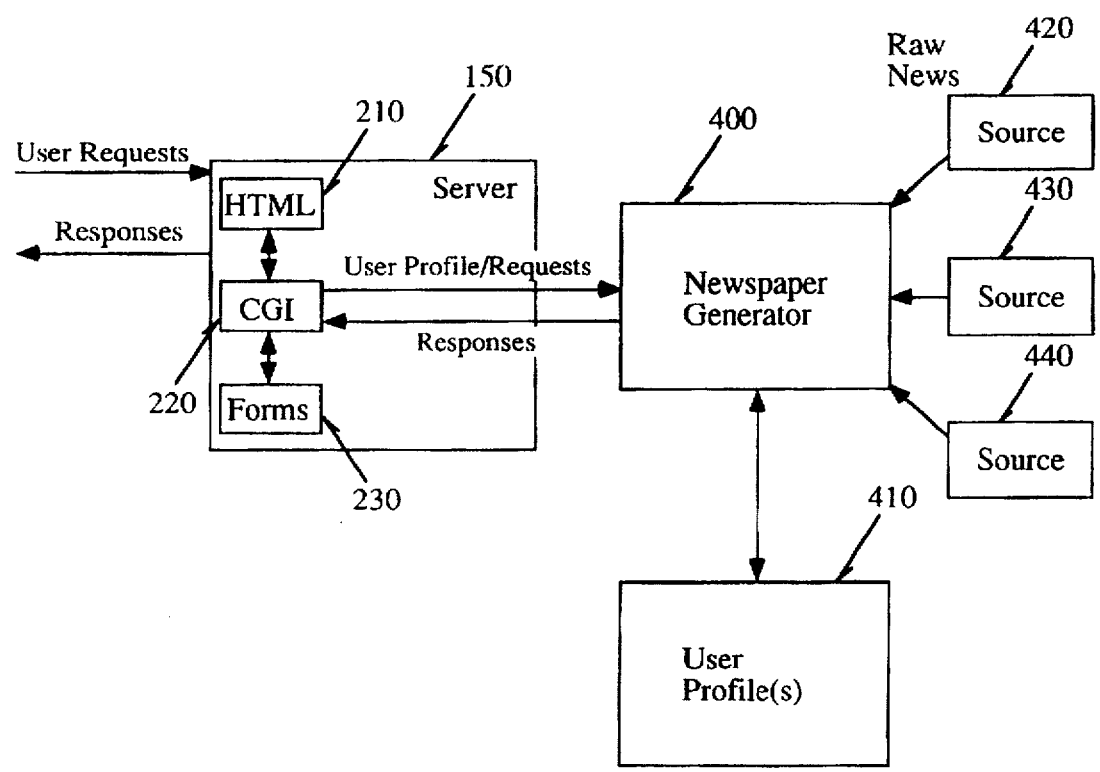
FIG. 4 shows a more detailed view of the processes operative within the server.

FIG. 4 illustrates the interaction between the server 150 and newspaper generator application program 400, which is operative under control of the CGI in the server. Depending upon user input, requests are sent to the active application in the server, in this case the personal newspaper generator 400, which causes the application to perform certain functions. For example, in the case of a profile which does not already exist in the server, newspaper generator 400 allows the creation and editing of search specifications, known as a "profile", on the server. This allows the server to generate the personal newspaper for the client when requested, or at regular intervals, according to implementation.

The user profile or requests which are received from the CGI 220 in the server 150 cause the newspaper generator to perform certain actions. For example, in the case of a profile creation, the profile is created and stored in local files, such as 410, which may be accessed at a later time by the server during editing operations or during creation of the newspaper. In this way, the stateless protocol of HTTP is transformed into a state-protocol, wherein the client or user profile is recalled from session to session. This also allows periodic automatic generation of the personal newspaper, for example, at regular intervals, such as several times a day or week, according to implementation.

As illustrated, the newspaper generator 400 uses a plurality of raw news sources 420, 430, and 440, which may be any of a number of available raw news feeds. For example, each of these may be a separate news source or wire service (e.g. Reuters, Associated Press), while another may be an electronic discussion group (e.g. a USENet newsgroup). Any number or types of sources may be used, according to implementation.

Figure 5A:
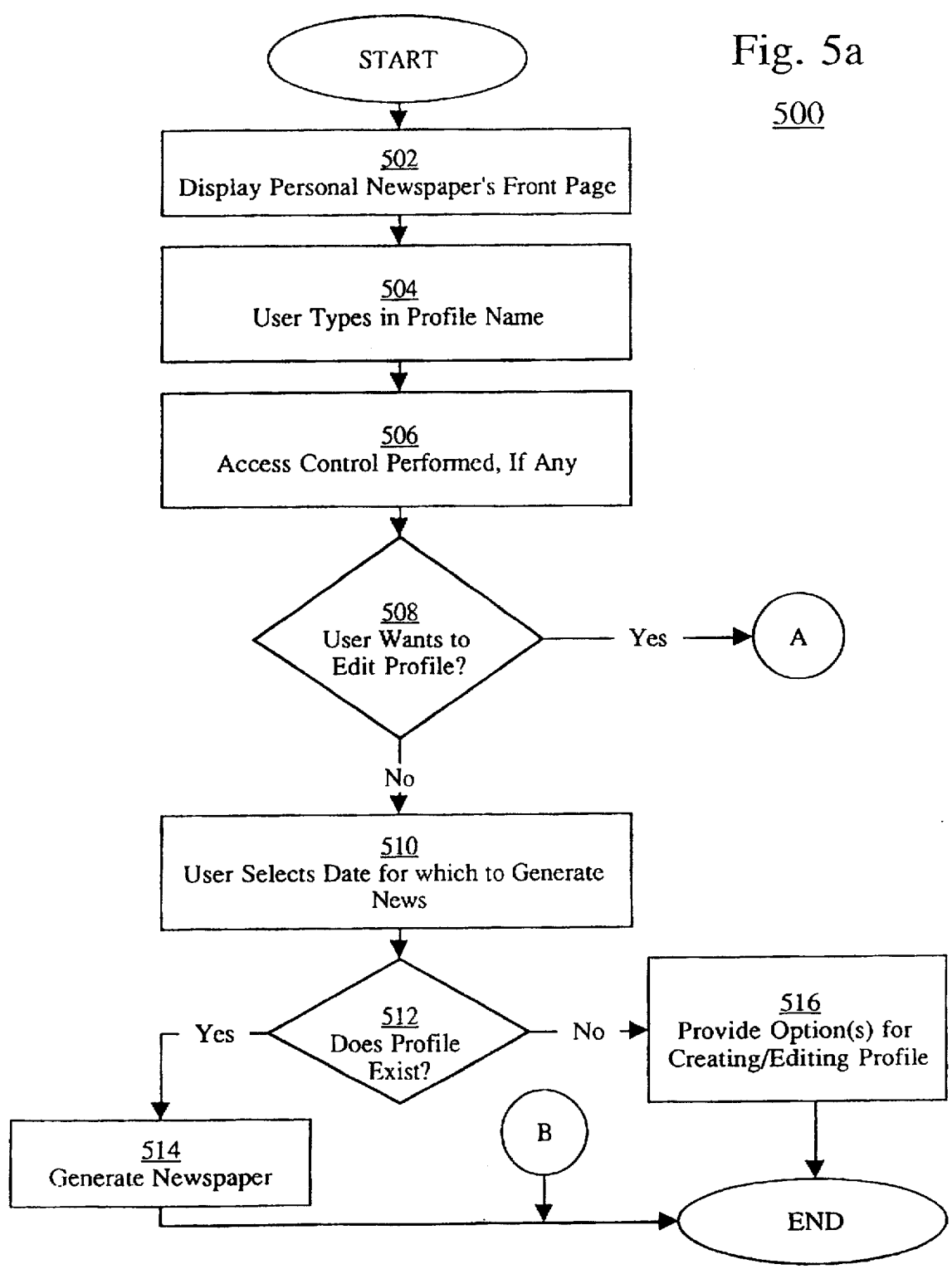
FIGS. 5a and 5b shows a sequence of steps performed in the server for generation of a profile and/or creation of a personal newspaper.
Figure 5B:
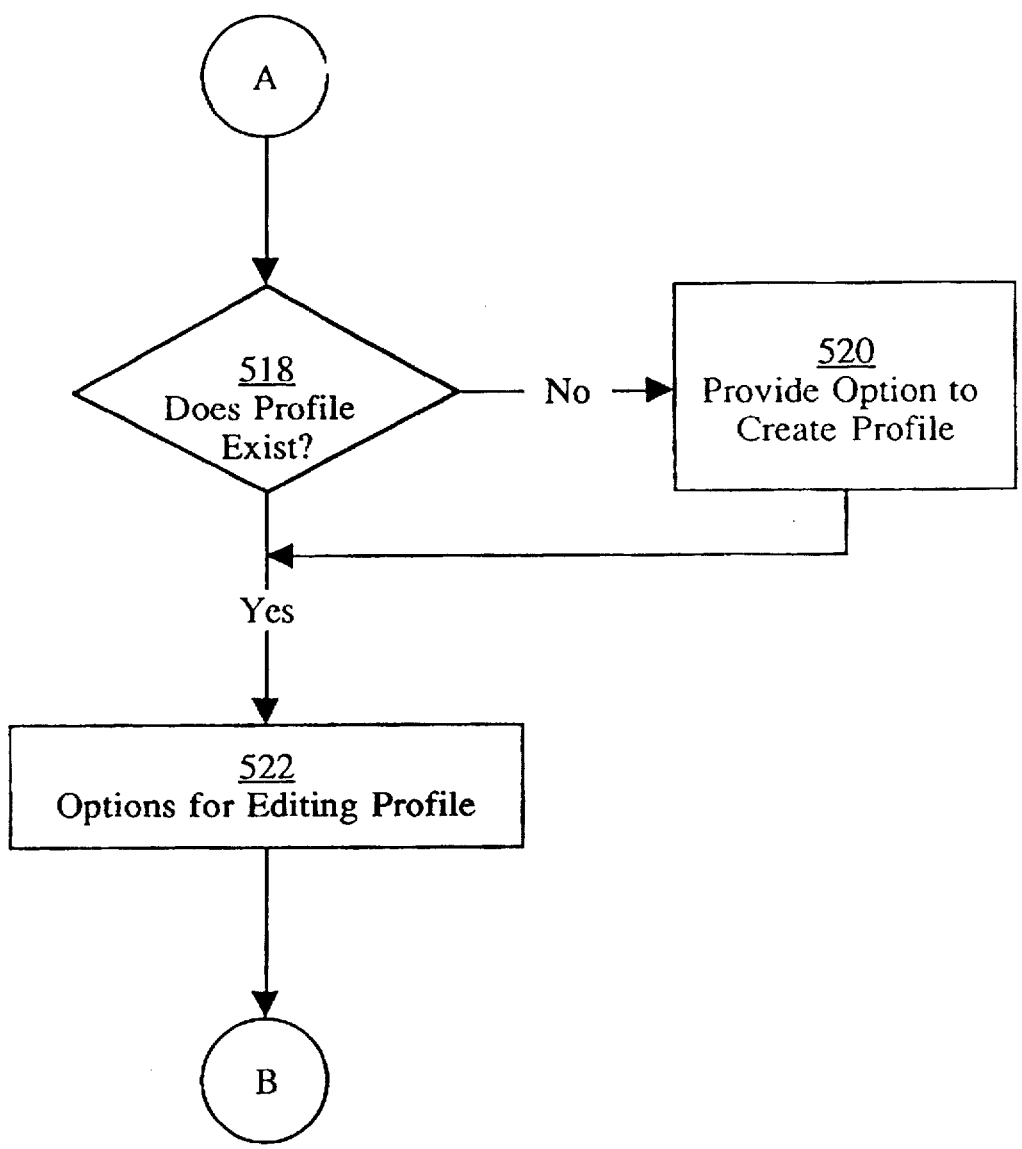
Figure 6:
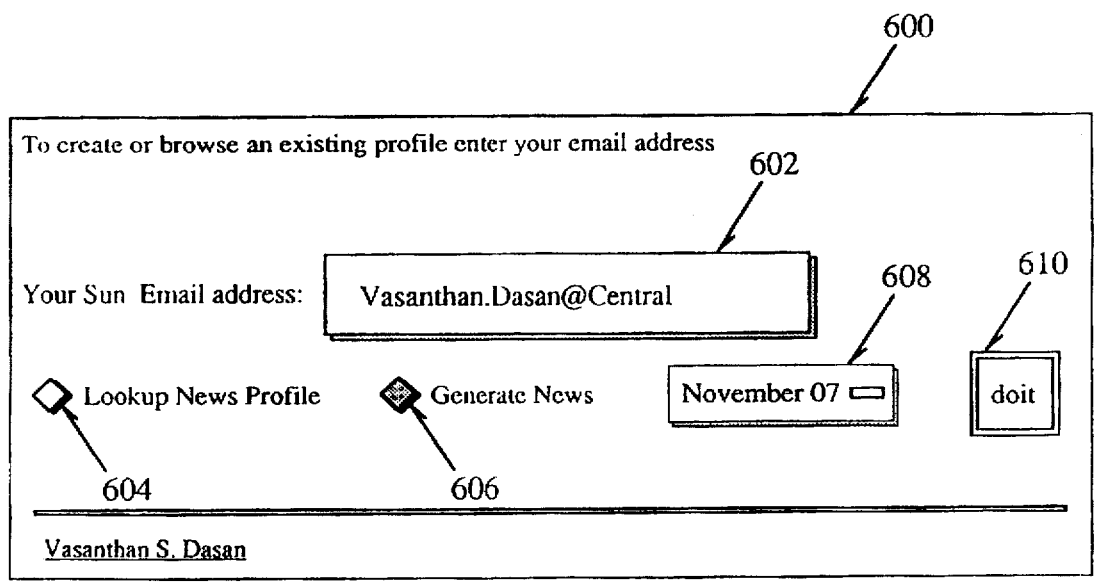
FIG. 6 shows the display screen for user control of the process illustrated in FIGS. 5a and 5b.

FIGS. 5a and 5b illustrates the logic of the operation of the personal newspaper generator. First, at step 502, the newspaper's front page, or welcome screen is displayed. This is the page which is displayed when the use first accesses the server via the specification of a URL (Uniform Resource Locator). A display screen, such as 600 illustrated in FIG. 6, is displayed upon the user's console. Options and other data entered on the form displayed on the console are committed, causing invocation of the newspaper generation program, upon selection by the user of the "doit" icon 610 on display 600. At step 504, the user can then enter, via the forms support in the browser, a profile or user name in field 602. This is enabled by selecting using a selection device or other means, and filling in the selected blank with the profile name (typically, an e-mail address of the user). If desired in the given implementation, access control may be performed at step 506, wherein the user is queried for a password.

If the user wishes to edit the profile as detected at step 508, which is indicated by the selection of the user interface object 604, then process 500 proceeds to FIG. 5b. If not (user interface object 606 is selected), then the user may specify a date for which the personal newspaper will be generated, such as by filling in the field 608 in the user interface form, by a pull-down, pop-up menu, or other means. Then, at step 512 it is determined whether the profile for the user exists. If so, then the newspaper is generated using the stored profile. According to the topics/subject/keywords selected by the user in his profile, the raw news source(s) are scanned, and that information matching the profile is gathered at step 514. If the profile does not exist, then at step 516, the user is given the options for creating and editing the profile.

If the user desired to edit and/or lookup the profile (icon 604 is selected) then, it is determined at step 518 on FIG. 5b whether the profile exists. If not, then the user is given the option to create a new profile. Then, the user can edit the profile, if created or it already exists, at step 522. Upon completion of any editing operations, the process is complete and returns to FIG. 5b.

A personal news profile is stored in a ASCII text file by topic by the newspaper generator. Each topic contains a number of sources (e.g. publications or newsfeeds) to search and corresponding search term(s). As in certain full-text retrieval systems, search terms may be delimited by disjunctions (the "|" character). An example of a news profile is as follows:

```
Sun News~.*~Sun MicrosystemslSMCClSunSoft~insensitive
Microsoft~.*~Microsoft~insensitive
Internet~usa.headlineslusa.nationallopinions-editorialsl
businesswirelprnewswirelbusiness.financel
international.francelinternational.germanylinternational.japan
international.other~InternetlInformation
SuperHighwaylMosaiclWWW~insensitive
Colorado~usa.headlineslusa.nationallopinionseditorialsl
businesswirelpr-newswirelbusiness.financelinternational.france
international.germanylinternational.japanlinternational.other~
ColoradolDenverlBoulder~insensitive
```

Each of the lists of strings for topics, sources and keywords are delimited in the file by the "~" character. The initial string (e.g. "Sun News") identifies the topic, the second set of strings (e.g. ".*") identifies the files specifications for the sources (wherein ".*" indicates searching in all raw sources), the next set of strings are the search terms, and the final string indicates whether the search terms are case sensitive or not. The creation and editing of a profile will now be discussed.

Figure 7:
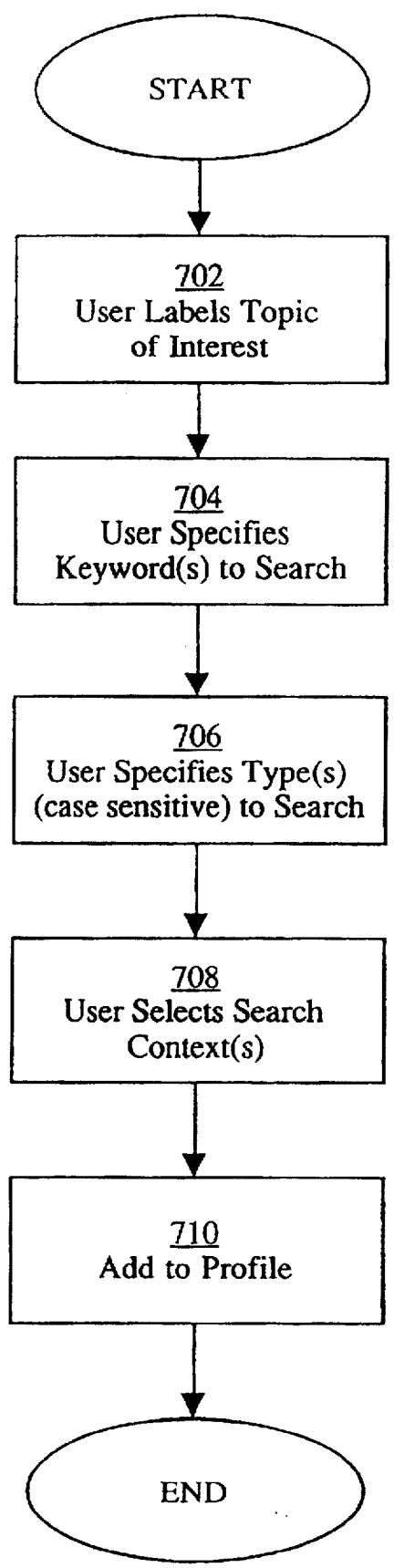
FIG. 7 shows a process of adding a topic to a profile.
Figure 8:
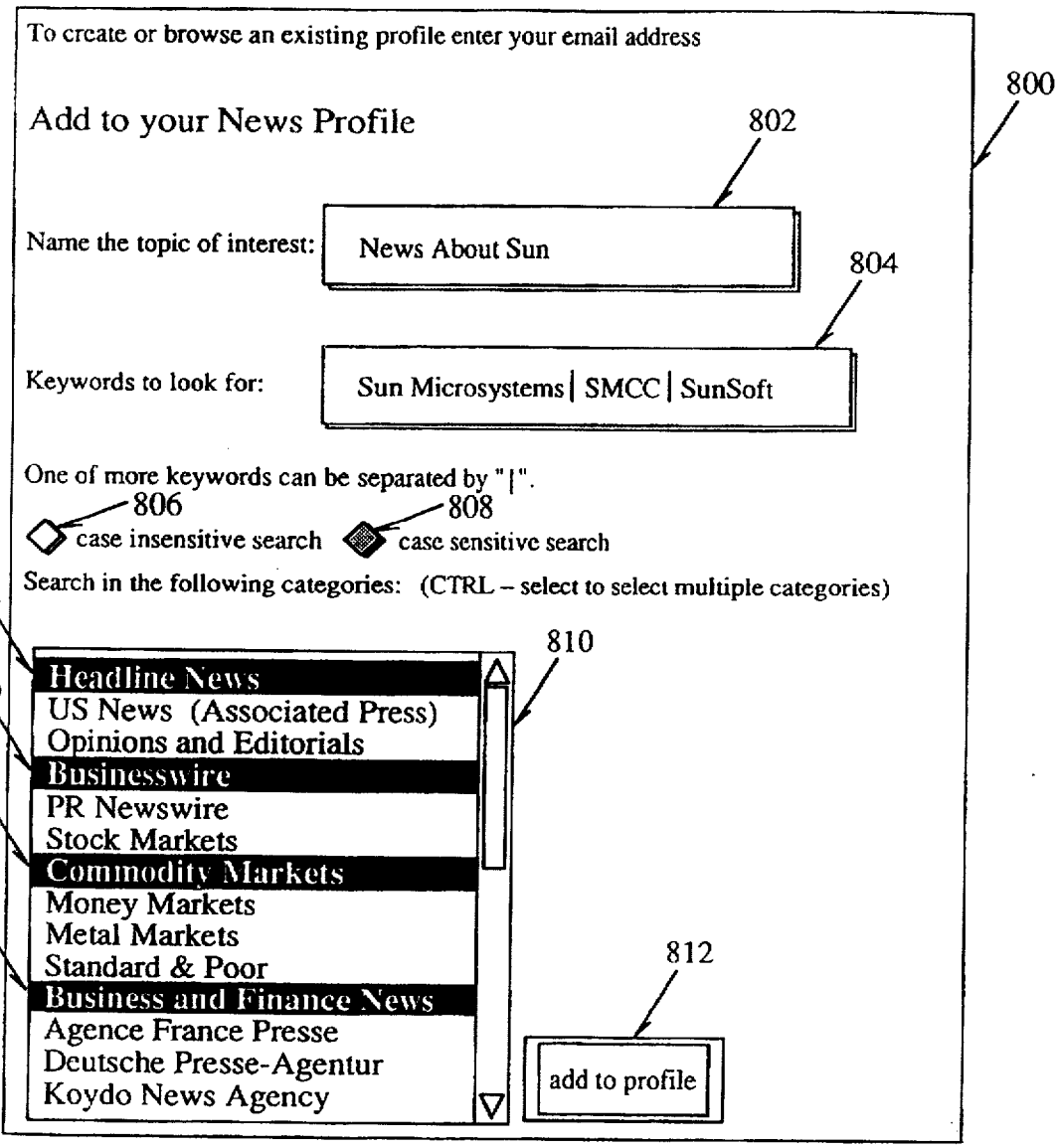
FIG. 8 shows a display used for controlling the operation of the process in FIG. 7.

The adding of topics to a news profile is shown in FIGS. 7 and 8. FIG. 7 shows the process steps performed by the profile generator portion of the newspaper generator, and FIG. 8 shows the user interface which controls the adding of topics to the profile. First, at step 702, the user labels the topic of interest, such as by filling in the field 802 provided by the fill-in forms feature of HTML or CGI. At step 704, the user specifies search terms used in the full-text search. These are illustrated in field 804. Any number of search terms may be used and the "|" character is treated as a disjunction ("or"). Then, by selecting either of user interface objects 806 or 808, the user specifies whether the search terms are case sensitive or not. This is detected at step 706. At step 708, using either a scrollable list containing selectable item(s), as illustrated in field 810, or other means, the user specifies the search context(s) (the publications, newsfeeds, etc. . . ) in which to search. By the selection of icon 812 or other commit means, the data entered into the screen 800 at step 710 is added to the user profile for generation of the newspaper.

Figure 9:
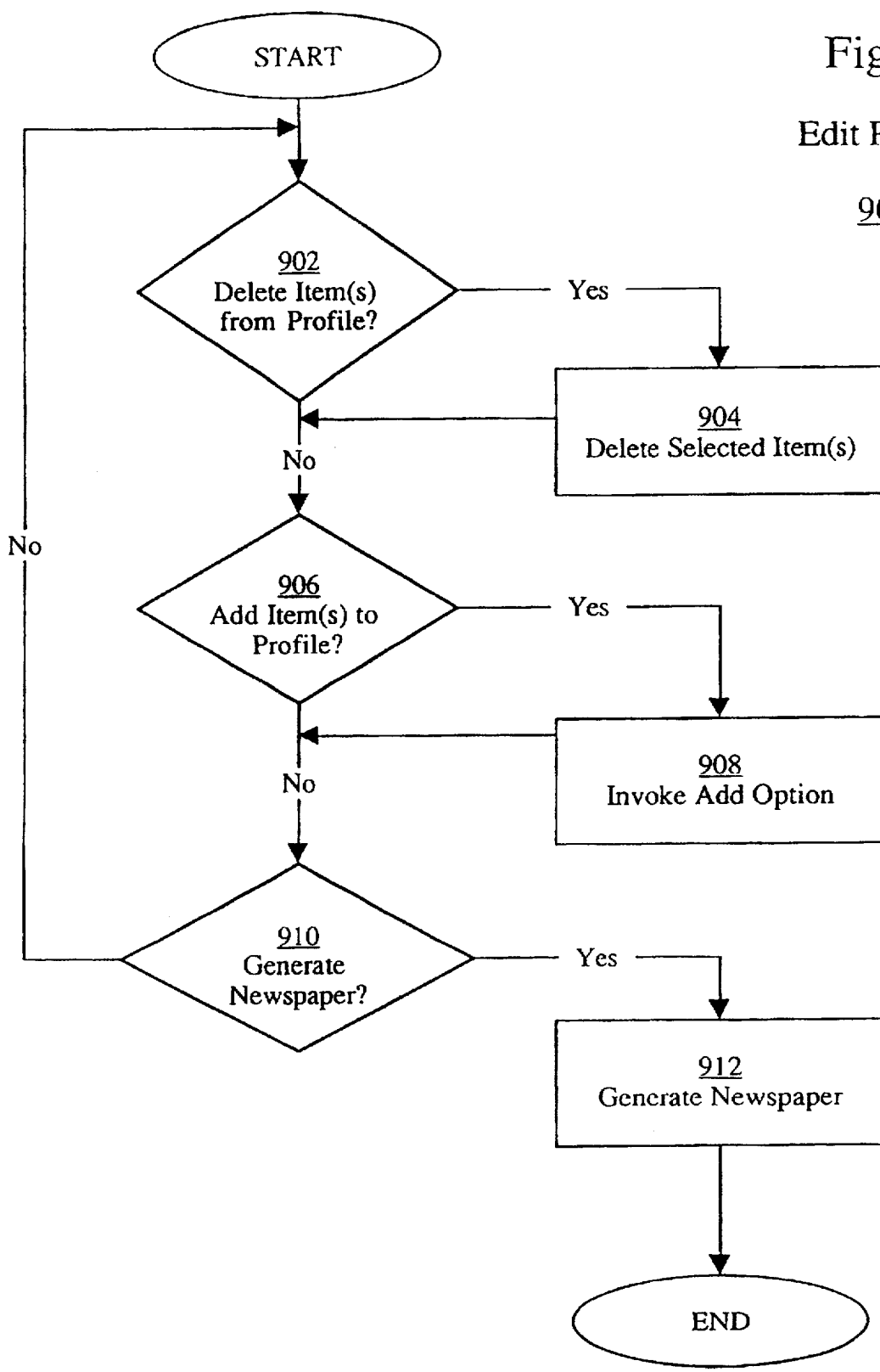
FIG. 9 shows a process of editing a user profile.
Figure 10:
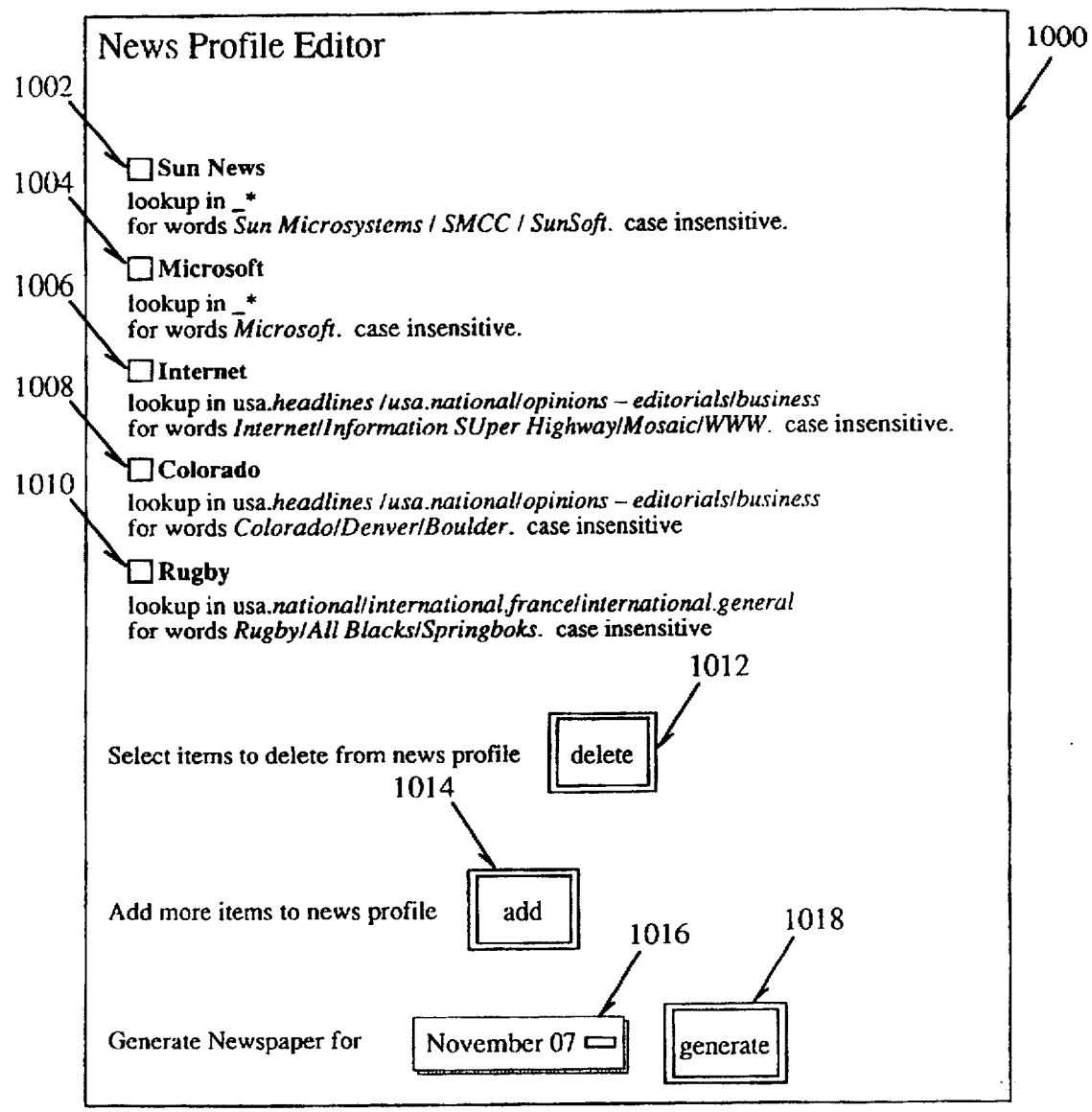
FIG. 10 shows a display used for controlling the editing process.

The process steps and user interface for editing a user profile is shown in FIGS. 9 and 10. For example, for a particular profile as displayed on screen 1000, any of the selection icons 1002–1010 may be selected for modification of that topic. At step 902 it is determined whether the user has selected the "delete" option for deleting topics from the profile (e.g. the selection of icon 1012 on screen 1000). If so, then the selected item(s) are deleted at step 904. Then it is determined at step 906 whether the user has selected the "add" icon 1014. If so, then the add option (process 700 of FIG. 7) is invoked at step 908. It is then determined at step 910 whether the generation of the newspaper based upon the profile is requested by the user. This is indicated by the user selecting icon 1018 (including, specifying a date for which the newspaper should be generated in field 1016). The specification of the date limits the scope of the search to the date(s) specified. If generation of the newspaper is requested, then the newspaper is generated based upon the profile at step 912.

As previously discussed, the process for actually creating the newspaper functions as a full-text retrieval system which is controlled by the context(s) (e.g. source(s) and date(s)) and corresponding search term(s) specified in each of the topics contained in the profile. This functions much in the same way as other on-line full-text retrieval systems except that it may be automatically performed by the server on demand or at periodic intervals, and that it is under control of the stored profile. The mechanics of this will be briefly discussed.

In implemented embodiments, raw news sources come in as large text files with a predetermined format. The full-text searching process performed during newspaper generation is executed upon these large files. Upon location of certain search terms having the specified context(s) in the file, the portion of the file containing the located article is parsed so as to be converted into an individual ASCII file which is resident on the server. The file names of the articles are unique, for unique reference using HTML. In implemented embodiments, the article file names are in numeric form and are the year, month, date, hour, minute and second the article was created all concatenated in order to be unique (no two articles are received exactly the same second). Then, via a second parsing process, the title of the article is used to create an anchor in the HTML page representation of the personal newspaper, which references the article by its file specification. Upon selection by the user, the text of the article can then be referenced at the server, and displayed as a second HTML page.

Figure 11:
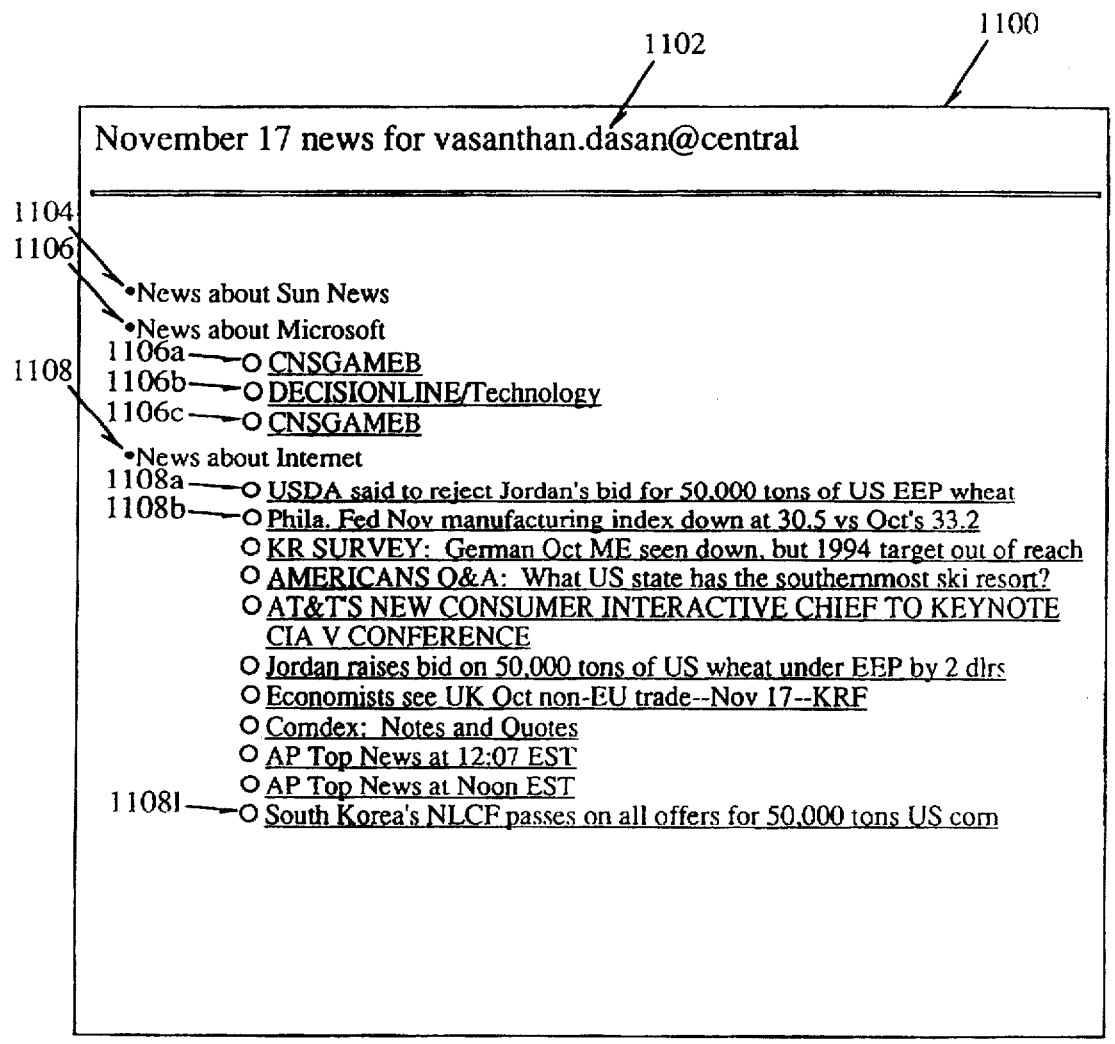
FIG. 11 shows the results of execution of the personal newspaper generation process according to the user-defined profile.
Figure 12:
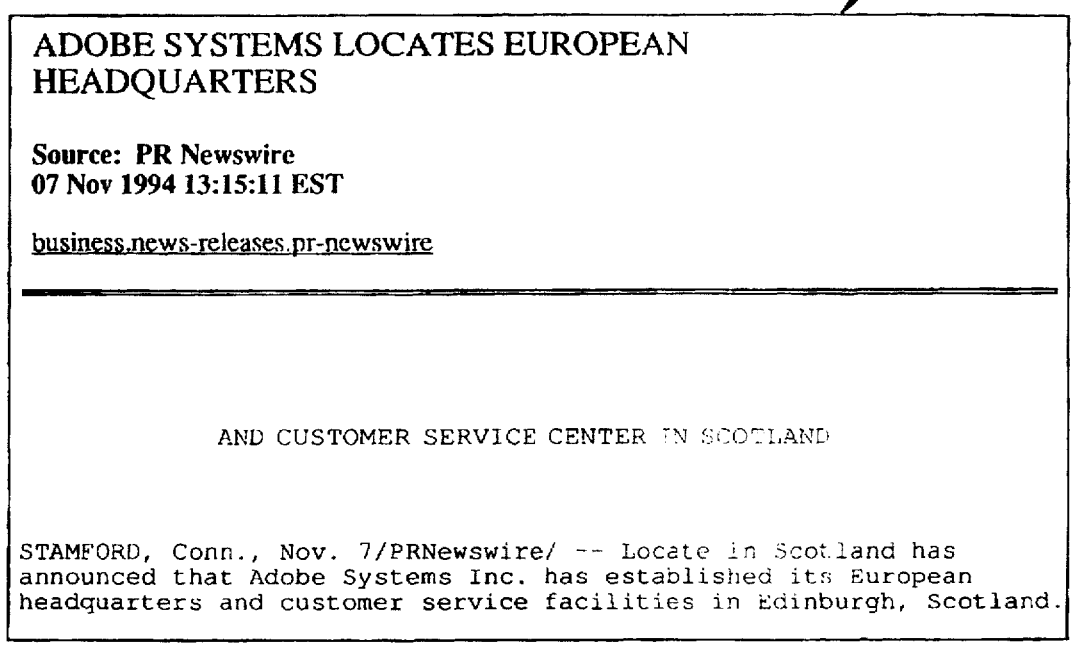
FIG. 12 shows the viewing of a single article contained in the personal newspaper.

FIG. 11 shows the results of the creation of a personal newspaper—the personal newspaper main screen. This is displayed at the client as a result of the full-text searching, the parsing and HTML page generation process performed at the server as discussed above. As illustrated in screen 1100, the profile name is displayed as 1102. Each of the topics from the profile is listed in a first level heading, such as 1104, 1106, 1108, etc. . . Each of the first level topic headings are followed by second level headings, such as 1106a–1106c, 1108a–1108l, etc. . . , listing the names of stories, if any, which match the search terms and sources. Via the selection by the user of the headings for each of the stories (the above-mentioned anchors), the text for the story may be referenced and viewed. An example of the display of an article from the personal newspaper is illustrated in screen 1200 of FIG. 12. Via HTML, a reference may also be inserted in the HTML page containing the article in order to allow the user to return to the personal newspaper main screen (not shown).

Thus, method and apparatus for a client application program retrieving data from a server based upon a defined and stored user profile of desired information has been described. Note that though the foregoing has particular utility and has been described with reference to certain specific embodiments in the figures and the text, that one may practice the present invention without implementing all of these specific details. Thus, the figures and the text are to be viewed an illustrative sense only, and not limit the present invention. The present invention is only to be limited by the appended claims which follow.

What is claimed is:

1. A computer-implemented method of retrieving information comprising the following steps:
   a. a user-controlled client establishing communication with a server over a communication channel;
   b. said client identifying a user-defined profile to said server;
   c. said server engaging a first application program, said first application program retrieving said user-defined profile;
   d. said first application program examining a database of information and automatically retrieving a subset of said information from said database based upon said user-defined profile; and
   e. said first application program transmitting said subset of said information from said database to said server and said server presenting said subset of said information to said client.

2. The method of claim 1 wherein said client comprises an HTTP (Hypertext Transfer Protocol) browser active on a first computer system and said server comprises an HTTP server application program active on a second computer system.

3. The method of claim 2 wherein said HTTP server application program communicates with said first application program active on said second computer system via a Common Gateway Interface (CGI).

4. The method of claim 3 further comprising the step of said first application program storing a file in said second computer system containing said user-defined profile in order to retain a state of said user-profile.

5. The method of claim 2 wherein said step of said first application program examining said database of information and automatically retrieving a subset of said information from said database based upon said user-defined profile is performed at periodic intervals irrespective of said client establishing communication with said server.

6. The method of claim 1 wherein said step of said first application program examining said database of information and automatically retrieving a subset of said information from said database based upon said user-defined profile includes:

a. said first application program retrieving source identifications and associated search terms from said user-defined profile;

b. said first application scanning in said database of information for sources identified by said source identifications and identifying a first set of files in said sources containing said associated search terms; and c. said first application program placing said first set of files into said subset of said information.

7. The method of claim 1 further comprising the step of said first application program causing said server to present options to said user to create or modify said profile, said options including:

a. a first option allowing said user to specify source identifications in said information and associated search terms to search for in said source identifications to said user-defined profile; and b. a second option allowing said user to specify delete and/or change said source identifications and/or said associated search terms in said profile.

8. An automatic method of retrieving information comprising the following steps:

a. a client under control of a user establishing communication with a server via HTTP Hypertext Transfer Protocol) exchanges between said client and said server;

b. said client providing an identification of a user-defined profile to said server;

c. said server engaging a first application program, said first application program retrieving said user-defined profile wherein said user-defined profile identifies information which is of interest to said user;

d. said first application program examining a database of information and automatically retrieving a subset of said information from said database based upon which information is of interest to said user as specified in said user-defined profile; and e. said server presenting said subset of said information from said database to said client as retrieved by said first application program.

9. The method of claim 8 wherein said client comprises an HTTP (Hypertext Transfer Protocol) browser application program active on a first computer system and said server comprises an HTTP server application program operative on a remote computer system.

10. The method of claim 9 further comprising the step of said first application program storing a file containing said user-defined profile in said remote computer system in order to retain a state of said user-profile.

11. The method of claim 8 wherein said step of said first application program examining said database of information and automatically retrieving a subset of said information from said database based upon said user-defined profile is performed at periodic intervals irrespective of said client establishing communication with said server.

12. The method of claim 8 wherein said step of said first application program examining said database of information and automatically retrieving a subset of said information from said database based upon said user-defined profile includes:

a. said first application program retrieving source identifications and associated search terms from said user-defined profile;

b. said first application scanning in said database of information for sources identified by said source identifications and identifying a first set of files in said sources containing said associated search terms; and c. said first application program placing said first set of files into said subset of said information.

13. The method of claim 12 wherein said source identifications and associated search terms from said user-defined profile are stored by topic.

14. The method of claim 8 further comprising the step of said first application program causing said server to present options to said user to create or modify said profile, said options including:

a. a first option allowing said user to specify source identifications in said information and associated search terms to search for in said source identifications to said user-defined profile; and b. a second option allowing said user to specify delete and/or change said source identifications and/or said associated search terms in said profile.

15. The method of claim 14 wherein said source identifications and said associated search terms are organized by topics.

16. The method of claim 15 wherein said server presenting said subset of said information from said database as generated by said first application program comprises presenting said subset organized by said topics.

17. A system for retrieving information comprising:

a. a server having an interface for engaging a first application program responsive to a client providing an identification of a user-defined profile;

b. said server having an execution control interface for causing said first application program to examine a database of information and automatically retrieve a subset of said information based upon which information is of interest to said user as identified in said user-defined profile; and c. said server having a presentation circuit for presenting said subset of said information from said database to said client responsive to a request by said client.

18. The system of claim 17 wherein said client comprises an HTTP (Hypertext Transfer Protocol) browser operative on a first computer system and said server comprises an HTTP server operative on a remote computer system.

19. The system of claim 17 wherein said server further includes a profile circuit for allowing said client to specify said user-defined profile and storing a file containing said user-defined profile in order to retain a state of said user-defined profile.

20. The system of claim 17 wherein said execution control interface comprises an activation circuit for activating said first application program at periodic intervals to cause said first application program to perform said examining said database of information and automatically retrieving a subset of said information from said database based upon said user-defined profile.

21. The system of claim 17 wherein said first application program examining said database of information and automatically retrieving a subset of said information from said database based upon said user-defined profile includes:
   a. said first application program retrieving source identifications and associated search terms from said user-defined profile;
   b. said first application scanning in said database of information for sources identified by said source identifications and identifying a first set of files in said sources containing said associated search terms; and
   c. said first application program placing said first set of files into said subset of said information.

22. The system of claim 21 wherein said source identifications and associated search terms from said user-defined profile are stored by topic.

23. The system of claim 17 further comprising said server having an option presentation circuit for presenting said options to said user to create or modify said profile, said options including:
   a. a first option allowing said user to specify source identifications in said information and associated search terms to search for in said source identifications of said user-defined profile; and
   b. a second option allowing said user to specify delete and/or change said source identifications and/or said associated search terms in said profile.

24. The system of claim 23 wherein said source identifications and said associated search terms are organized by topics.

25. The system of claim 24 wherein said presentation circuit for presenting said subset of said information from said database as generated by said first application program comprises a topic presentation circuit for presenting said subset of said information organized by said topics.

26. A computer-implemented method of retrieving information comprising the following steps:
   a. a user-controlled client establishing communication with a server;
   b. said client identifying a user-defined profile to said server;
   c. said server engaging a first application program, said first application program retrieving said user-defined profile;
   d. said first application program examining a database of information and automatically retrieving a subset of said information from said database based upon said user-defined profile; and
   e. said first application program transmitting said subset of said information from said database to said server and said server presenting said subset of said information to said client.

* * * * *

(12) EX PARTE REEXAMINATION CERTIFICATE (7049th)
United States Patent
Dasan

(10) Number: US 5,761,662 C1
(45) Certificate Issued: Sep. 8, 2009

(54) PERSONALIZED INFORMATION RETRIEVAL USING USER-DEFINED PROFILE

(75) Inventor: Vasanthan S. Dasan, Colorado Springs, CO (US)

(73) Assignee: Sun Microsystems, Inc., Mountain View, CA (US)

Reexamination Request:
No. 90/009,099, Mar. 28, 2008

Reexamination Certificate for:
Patent No.: 5,761,662
Issued: Jun. 2, 1998
Appl. No.: 08/852,455
Filed: May 8, 1997

Related U.S. Application Data

(63) Continuation of application No. 08/360,997, filed on Dec. 20, 1994, now abandoned.

(51) Int. Cl.
*G06F 17/30* (2006.01)

(52) U.S. Cl. .................... 707/10; 707/100; 707/104.1; 707/3; 707/4; 707/9; 707/E17.01; 707/E17.109; 715/234; 709/206

(58) Field of Classification Search .................... None
See application file for complete search history.

(56) References Cited

U.S. PATENT DOCUMENTS 5,428,778 A  6/1995  Brookes

OTHER PUBLICATIONS

Ojala, Marydee; "SDIS: The Star Wars of Business Searching,"DDatabase, Dec. 1998, 11,6, pp. 82–89.
Frei, H. P. and Wyle, M. F., "Retrieval Algorithm Effectivenessiin a Wide Area Network Information Filter," Proceedingsoof the 14th Annual International ACM SIGIR Conference, 1991, pp. 114–122.
Berners–Lee, Tim, "Hypertext Transfer Protocol," Internet Engineering Task Force (IETF) Internet Draft, Nov. 5, 1993 pp. 1–25.
Spera, Simon, "Binary Gateway Interface—An API for Dynamically Extensible HTTP Servers," Internet Draft Revision 1.4, Jul. 1, 1994, pp. 1–4.

*Primary Examiner*—Deandra M Hughes

(57) ABSTRACT

An automatic method and system for retrieving information based on a user-defined profile (e.g. a personalized newspaper). A user-controlled client establishes communication with a stateless server, the server presenting a list of options to the client between the server and the client. The client provides an identification of the user-defined profile. The server engages a first application program. the first application program retrieving the user-defined profile wherein the user-defined profile identifies information which is of interest to the user. The first application program examines a database of information and automatically retrieves a subset of the information from the database based upon which information is of interest to the user as identified in the user-defined profile. The server presents the subset of the information from the database as generated by the first application program to the client. The first application program can store a file containing the user-defined profile in order to retain a state of the user-profile, and cause the stateless server to emulate a server which retains its state from session to session.

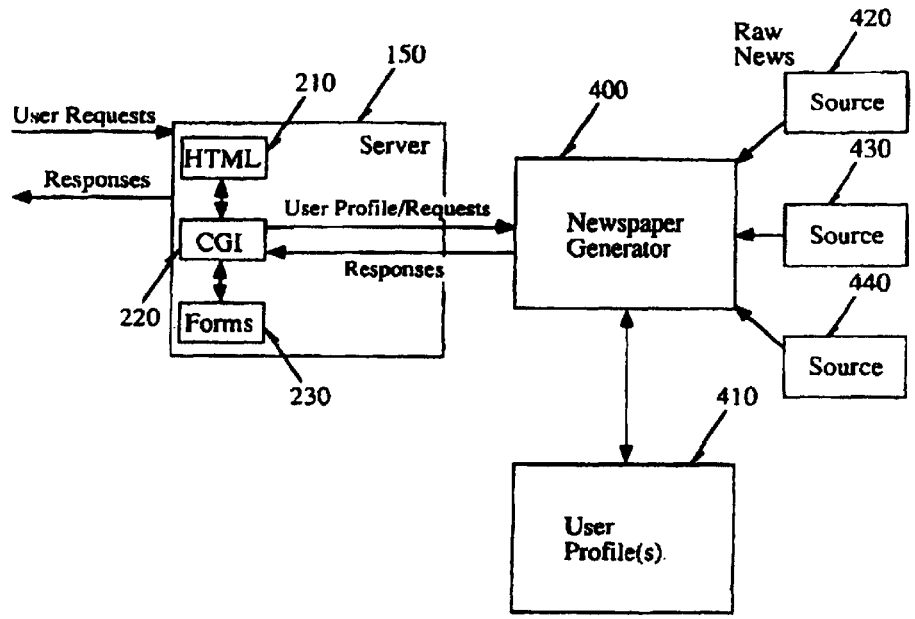

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–3, 9–10, 18–19 and 26 are cancelled.

Claims 1, 4–5, 8 and 17 are determined to be patentable as amended.

Claims 6–7, 11–16 and 20–25, dependent on an amended claim, are determined to be patentable.

New claims 27–32 are added and determined to be patentable.

1. A computer-implemented method of retrieving information comprising the following steps:
   a. a user-controlled client, *comprising an HTTP (Hypertext Transfer Protocol) browser active on a first computer system* establishing communication with a server, *comprising an HTTP server application program active on a second computer system* over a communication channel;
   b. said client identifying a user-defined profile to said server;
   c. said server engaging a first application program, said first application program retrieving said user-defined profile, *wherein said HTTP server applicaton program communicates with said first application program active on said second computer system via a Common Gateway Interface (CGI)*;
   d. said first application program examining a database of information and automatically retrieving a subset of said information from said database based upon said user-defined profile; and
   e. said first application program transmitting said subset of said information from said database to said server and said server presenting said subset of said information to said client.

4. The method of claim [3] *1* further comprising the step of said step of first application program storing a file in said second computer system containing said user-defined profile in order to retain a state of said user-profile.

5. The method of claim [2] *1* wherein said first application program examining said database of information and automatically retrieving a subset of said information from said database based upon said user-defined profile is performed at periodic intervals irrespective of said client establishing communication with said server.

8. An automatic method of retrieving information comprising the following steps:
   a. a client under control of a user establishing communication with a server via HTTP (Hypertext Transfer Protocol) exchanges between said client and said server, *wherein said client comprises an HTTP browser application program active on a first computer system and said server comprises an HTTP server application program operative on a remote computer system*;
   b. said client providing an identification of a user-defined profile to said server;
   c. said server engaging a first application program, said first application program retrieving said user-defined profile wherein said user-defined profile identifies information which is of interest to said user;
   d. said first application program examining a database of information and automatically retrieving a subset of said information from said database based upon which information is of interest to said user as specified in said user-defined profile, *and wherein said first application program storing a file containing said user-defined profile in said remote computer system in order to retain a state of said user-profile*; and
   e. said server presenting said subset of said information from said database to said client as retrieved by said first application program.

17. A system for retrieving information comprising:
   a. a server having an interface for engaging a first application program responsive to a client *which comprises an HTTP (Hypertext Transfer Protocol) browser operative on a first computer system and* providing an identification of a user-defined profile, *wherein said server comprises an HTTP server operative on a remote computer system and further includes a profile circuit for allowing said client to specify said user-defined profile and storing a file containing said user-defined profile in order to retain a state of said user-defined profile*;
   b. said server having an execution control interface for causing said first application program to examine a database of information and automatically retrieve a subset of said information based upon which information is of interest to said user as identified in said user-defined profile; and
   c. said server having a presentation circuit for presenting said subset of said information from said database to said client responsive to a request by said client.

*27. A computer-implemented method of retrieving information comprising the following steps:*
   *a. a user-controlled client computer establishing communication with a server computer over a communication channel;*
   *b. said client computer identifying a user-defined profile to said server computer;*
   *c. said server computer engaging a first application program, said first application program retrieving said user-defined profile;*
   *d. said first application program examining a database of information and automatically retrieving a subset of said information from said database based upon said user-defined profile;*
   *e. said first application program transmitting said subset of said information from said database to said server computer and said server computer presenting said subset of said information to said client computer; and*
   *f. said server computer communicating with said first application program via a Common Gateway Interface (CGI).*

*28. The method of claim 27 further comprising the step of said first application program storing a file in said server computer containing said user defined profile in order to retain a state of said user profile.*

29. A computer-implemented method of retrieving information comprising the following steps:

a. a user-controlled client computer establishing communication with a server computer over a communication channel;

b. said client computer identifying a user-defined profile to said server computer;

c. said server computer engaging a first application program, said first application program retrieving said user-defined profile;

d. said first application program examining a database of information and automatically retrieving a subset of said information from said database based upon said user-defined profile;

e. said first application program storing a file in said server computer containing said user defined profile in order to retain a state of said user profile;

f. said first application program transmitting said subset of said information from said database to said server computer; and g. said server computer presenting said subset of said information to said client computer.

30. An automatic method of retrieving information comprising the following steps:

a. a client under control of a user establishing communication with a server via HTTP (Hypertext Transfer Protocol) exchanges between said client and said server;

b. said client providing an identification of a user-defined profile to said server;

c. said server engaging a first application program, said first application program retrieving said user-defined profile wherein said user-defined profile identifies information which is of interest to said user;

d. said first application program examining a database of information and automatically retrieving a subset of said information from said database based upon which information is of interest to said user as specified in said user-defined profile, e. said server presenting said subset of said information from said database to said client as retrieved by said first application program; and f. said first application program storing a file containing said user-defined profile in said server in order to retain a state of said user-profile.

31. An automatic method of retrieving information comprising the following steps:

a. a client under control of a user establishing communication with a server via HTTP (Hypertext Transfer Protocol) exchanges between said client and said server;

b. said client providing an identification of a user-defined profile to said server;

c. said server engaging a first application program, said first application program retrieving said user-defined profile wherein said user-defined profile identifies information which is of interest to said user;

d. said first application program examining a database of information and automatically retrieving a subset of said information from said database based upon which information is of interest to said user as specified in said user-defined profile, e. said server presenting said subset of said information from said database to said client as retrieved by said first application program; and f. said server communicating with said first application program via a Common Gateway Interface (CGI).

32. A system for retrieving information comprising:

a. a server having an interface for engaging a first application progam responsive to a client providing an identification of a user-defined profile;

b. said server having an execution control interface for causing said first application program to examine a database of information and automatically retrieve a subset of said information based upon which information is of interest to said user as identified in said user-defined profile, wherein said server communicates with said first application program via a Common Gateway Interface (CGI); and c. said server having a presentation circuit for presenting said subset of said information from said database to said client responsive to a request by said client.

\* \* \* \* \*